United States Patent
Meylan

(10) Patent No.: US 10,924,970 B2
(45) Date of Patent: Feb. 16, 2021

(54) METHOD AND APPARATUS FOR HANDLING OUT-OF-ORDER PACKETS DURING HANDOVER IN A WIRELESS COMMUNICATION SYSTEM

(71) Applicant: QUALCOMM Incorporated, San Diego, CA (US)

(72) Inventor: Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/335,345

(22) Filed: Oct. 26, 2016

(65) Prior Publication Data

US 2017/0048765 A1 Feb. 16, 2017
US 2017/0367017 A9 Dec. 21, 2017

Related U.S. Application Data

(62) Division of application No. 12/276,590, filed on Nov. 24, 2008, now abandoned.

(Continued)

(51) Int. Cl.
*H04W 36/02* (2009.01)
*H04L 1/18* (2006.01)
(Continued)

(52) U.S. Cl.
CPC ......... *H04W 36/023* (2013.01); *H04L 1/1841* (2013.01); *H04L 1/1874* (2013.01);
(Continued)

(58) Field of Classification Search
None
See application file for complete search history.

(56) References Cited

U.S. PATENT DOCUMENTS 5,548,593 A 8/1996 Peschi
6,424,625 B1 * 7/2002 Larsson ............... H04L 1/1806
370/236

(Continued)

FOREIGN PATENT DOCUMENTS

EP 1320274 A2 6/2003
EP 1337125 A2 8/2003
(Continued)

OTHER PUBLICATIONS

3GPP; Technical Specification Group Radio Access Network; "TS 36.300 V8.2.0—Evolved Universal Terrestrial Radio Access (E-UTRA) and Evolved Universal Terrestrial Radio Access Network (E-UTRAN) ; Overall description ; Stage 2" 3rd Generation Partnership Project; Technical Specification (TS), vol. 36.300, No. v8.2.0, Sep. 1, 2007 (Sep. 1, 2007), XP002595686.

(Continued)

*Primary Examiner* — Faruk Hamza
*Assistant Examiner* — Cassandra L Decker
(74) *Attorney, Agent, or Firm* — Dalei Dong; Procopio, Cory, Hargreaves & Savitch LLP

(57) ABSTRACT

Techniques for sending packets and maintaining synchronization during handover is described. A user equipment (UE) may be handed over from a source base station to a target base station. The source base station may forward packets for the UE to the target base station, which may receive the packets out of order. In one design, the target base station may determine whether each packet can be sent in order to the UE, send the packet if it can be sent in order, and discard the packet otherwise. In another design, the target base station may re-order packets received within a re-ordering window and may send the re-ordered packets to the UE. In yet another design, the target base station may process each packet received out of order as if the packet is in order, e.g., (Continued)

by incrementing a hyper-frame number (HFN) or re-assigning the packet with a later sequence number.

14 Claims, 11 Drawing Sheets

Related U.S. Application Data

(60) Provisional application No. 60/990,589, filed on Nov. 27, 2007, provisional application No. 60/990,906, filed on Nov. 28, 2007.

(51) Int. Cl.
    *H04L 12/801* (2013.01)
    *H04L 12/823* (2013.01)

(52) U.S. Cl.
    CPC .............. *H04L 47/10* (2013.01); *H04L 47/14* (2013.01); *H04L 47/32* (2013.01); *H04L 47/34* (2013.01); *H04W 36/02* (2013.01)

(56) References Cited

U.S. PATENT DOCUMENTS

| | | | |
|---|---|---|---|
| 6,480,477 | B1 | 11/2002 | Treadaway et al. |
| 7,099,346 | B1* | 8/2006 | Kanterakis ............ H04L 47/14 370/329 |
| 7,330,439 | B1 | 2/2008 | Puuskari et al. |
| 7,395,538 | B1* | 7/2008 | Carney ............... H04L 67/1002 712/1 |
| 7,573,883 | B2 | 8/2009 | Padmanaban et al. |
| 7,796,602 | B2* | 9/2010 | Guo ................ H04L 47/10 370/394 |
| 2003/0007642 | A1 | 1/2003 | Jiang et al. |
| 2003/0108045 | A1 | 6/2003 | Jayam et al. |
| 2003/0128705 | A1* | 7/2003 | Yi ..................... H04L 1/1841 370/394 |
| 2003/0157927 | A1 | 8/2003 | Yi et al. |
| 2004/0131040 | A1* | 7/2004 | Gruhl .................. H04L 45/04 370/349 |
| 2005/0243831 | A1* | 11/2005 | Zhang ................ H04L 1/1812 370/394 |
| 2006/0251083 | A1 | 11/2006 | Sugaya |
| 2007/0042782 | A1* | 2/2007 | Lee ................... H04L 1/1841 455/450 |
| 2007/0064729 | A1* | 3/2007 | Rodrigo ................. H04L 47/10 370/468 |
| 2007/0071005 | A1* | 3/2007 | Mayhew ............. H04L 1/1838 370/392 |
| 2007/0250637 | A1 | 10/2007 | Jiang |
| 2007/0280194 | A1* | 12/2007 | Wu .................. H04L 12/66 370/351 |
| 2008/0182579 | A1 | 7/2008 | Wang et al. |
| 2008/0225765 | A1* | 9/2008 | Marinier ............. H04L 1/1841 370/310 |
| 2008/0259832 | A1* | 10/2008 | Tseng ................. H04L 47/27 370/310 |
| 2008/0259905 | A1 | 10/2008 | Connors et al. |
| 2008/0273532 | A1 | 11/2008 | Bar-David et al. |
| 2008/0304479 | A1* | 12/2008 | Scott .................. H04L 1/0079 370/389 |
| 2009/0016301 | A1* | 1/2009 | Sammour ............. H04L 49/90 370/331 |
| 2009/0046577 | A1 | 2/2009 | Marin |
| 2009/0168723 | A1 | 7/2009 | Meylan |
| 2009/0180437 | A1 | 7/2009 | Kanazawa |
| 2009/0213810 | A1 | 8/2009 | Shousterman et al. |
| 2009/0245201 | A1 | 10/2009 | Motegi et al. |
| 2010/0002650 | A1* | 1/2010 | Ahluwalia ............ H04L 1/1874 370/331 |

FOREIGN PATENT DOCUMENTS

| | | |
|---|---|---|
| JP | 64027342 | 1/1989 |
| JP | 2004015143 A | 1/2004 |
| JP | 2004086508 A | 3/2004 |
| JP | 2005012718 A | 1/2005 |
| JP | 2005518135 A | 6/2005 |
| JP | 2007266775 | 10/2007 |
| JP | 2009139452 A | 6/2009 |
| WO | WO-2007116701 A1 | 10/2007 |
| WO | WO-2007125592 A1 | 11/2007 |

OTHER PUBLICATIONS

Ericsson: "Downlink Reordering at Intra-LTE Mobility" 3GPP Draft; R3-071828, 3rd Generation Partnership Project (3GPP), Mobile Competence Centre ; 650, Route Des Lucioles ; F-06921 Sophia-Antipolis Cedex ; France, vol. tsg_ranWG3_luTSGR3_57bisdocs, No. Sophia Antipolis, France; Oct. 8, 2007, Oct. 2, 2007 (Oct. 2, 2007), XP050162628 the whole document.

Ericsson: "Text Proposal: SN Handling at Intra-LTE Mobility" 3GPP Draft; R3-072416, SRD Generation Partnership Project (3GPP), Mobile Competence Centre ; 650, Route Des Lucioles ; F-06921 Sophia-Antipolis Cedex ; France, vol. tsg_ranWG3_luTSGR3_58docs, No. Jejulsland;Nov. 5, 2007, Nov. 13, 2007 (Nov. 13, 2007), XP050163191.

Fujitsu, "Handling re-ordering in LTE during handover", 3GPP TSG-RAN WG3 #55-bis, R3-070681, Mar. 31, 2007.

Fujitsu: "Location of DL PDCP Reordering in LTE during Handover" 3GPP Draft; R2-072043, 3rd Generation Partnership Project (3GPP), Mobile Competence Centre ; 650, Route Des Lucioles ; F-06921 Sophia-Antipolis Cedex ; France, No. Kobe, Japan; May 7, 2007, May 2, 2007 (May 2, 2007), XP050134915.

International Search Report & Written Opinion—PCT/US2008/084670, International Search Authority—European Patent Office—dated Jun. 29, 2009.

LG Electronics Inc. "Detailed DL handover behavior", 3GPP TSG-RAN WG2 #59 Aug. 24, 2007, Aug. 2007, R2-073040, pp. 2-3, http://ftp.3gpp.org/ftp/tsg_ran/WG2_RL2/TSGR2_59/Docs/R2-073040.zip.

LG Electronics Inc: "Detailed DL handover behaviour" 3GPP Draft; R2-074217 Detailed DL Handover Behaviour, 3rd Generation Partnership Project (3GPP), Mobile Competence Centre ; 650, Route Des Lucioles ; F-06921 Sophia-Anti Polis Cedex ; France, vol. tsg_ranWG2_RL2TSGR2_59bisDocs, No. Shanghai,China;Oct. 8, 2007, Oct. 1, 2007 (Oct. 1, 2007), XP050136836 p. 1-p. 3; figure 1.

Nokia, Nokia Siemens Networks, "Data Forwarding mechanism over X2 and S1 interface", 3GPP TSG-RAN WG3 #57, R3-071573, Aug. 24, 2007.

Qualcomm Europe: "Enhanced SRNS relocation for the HSPA Evolution" 3GPP Draft; R2-071199, 3rd Generation Partnership Project (3GPP), Mobile Competence Centre; 650, Route Des Lucioles ; F-06921 Sophia-Antipolis Cedex ; France, No. St. Julian; Mar. 26, 2007, Mar. 20, 2007 (Mar. 20, 2007), XP050134172 p. 5.

Qualcomm Europe: "Qualcomm proposal for E-UTRAN Architecture and Protocols" 3GPP Draft; R2-052921, SRD Generation Partnership Project (3GPP), Mobile Competence Centre ; 650, Route Des Lucioles ; F-06921 Sophia-Antipolis Cedex; France, vol. 1, No. Seoul,Korea;Nov. 7, 2005,Nov. 1, 2005 (Nov. 1, 2005), XP050130142.

Taiwan Search Report—TW097146065—TIPO—dated Apr. 19, 2012.

\* cited by examiner

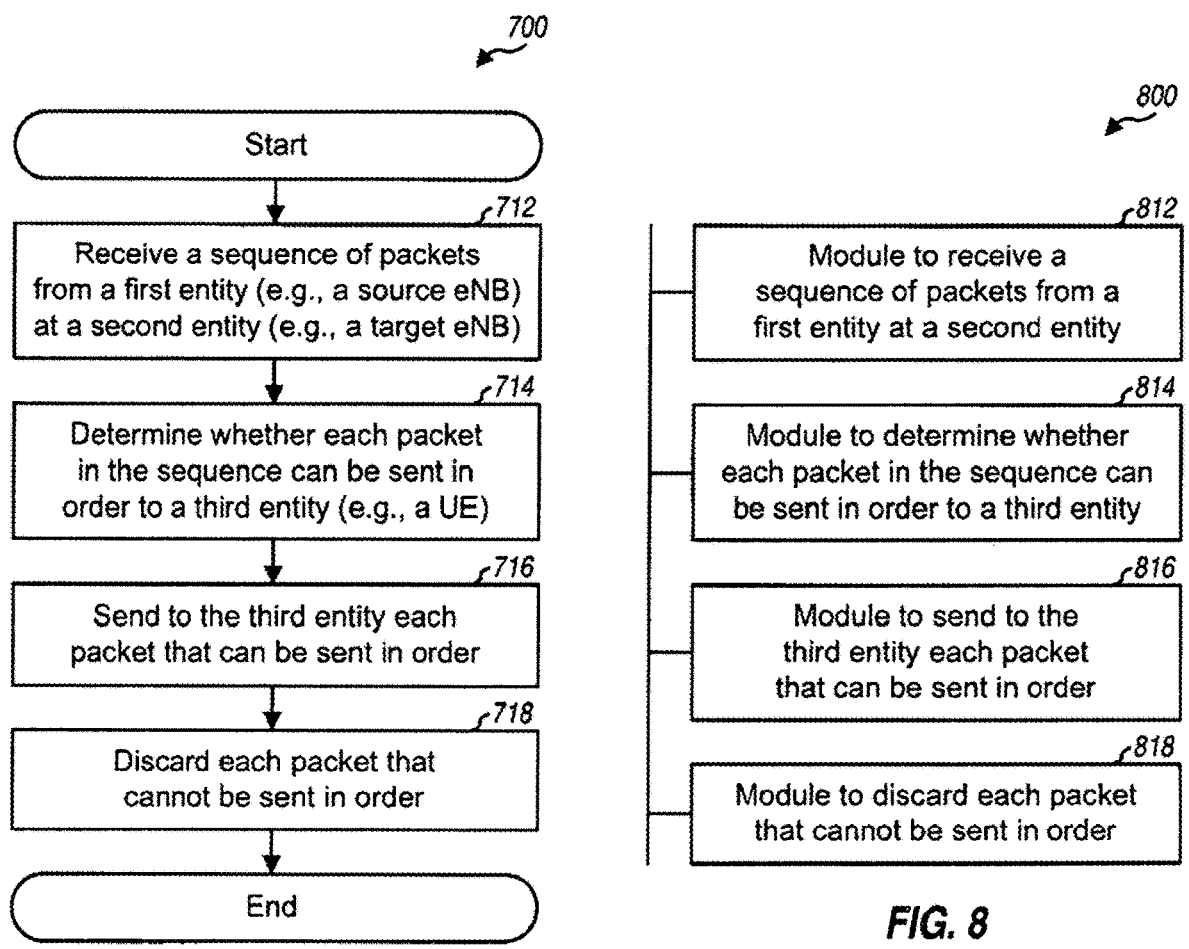

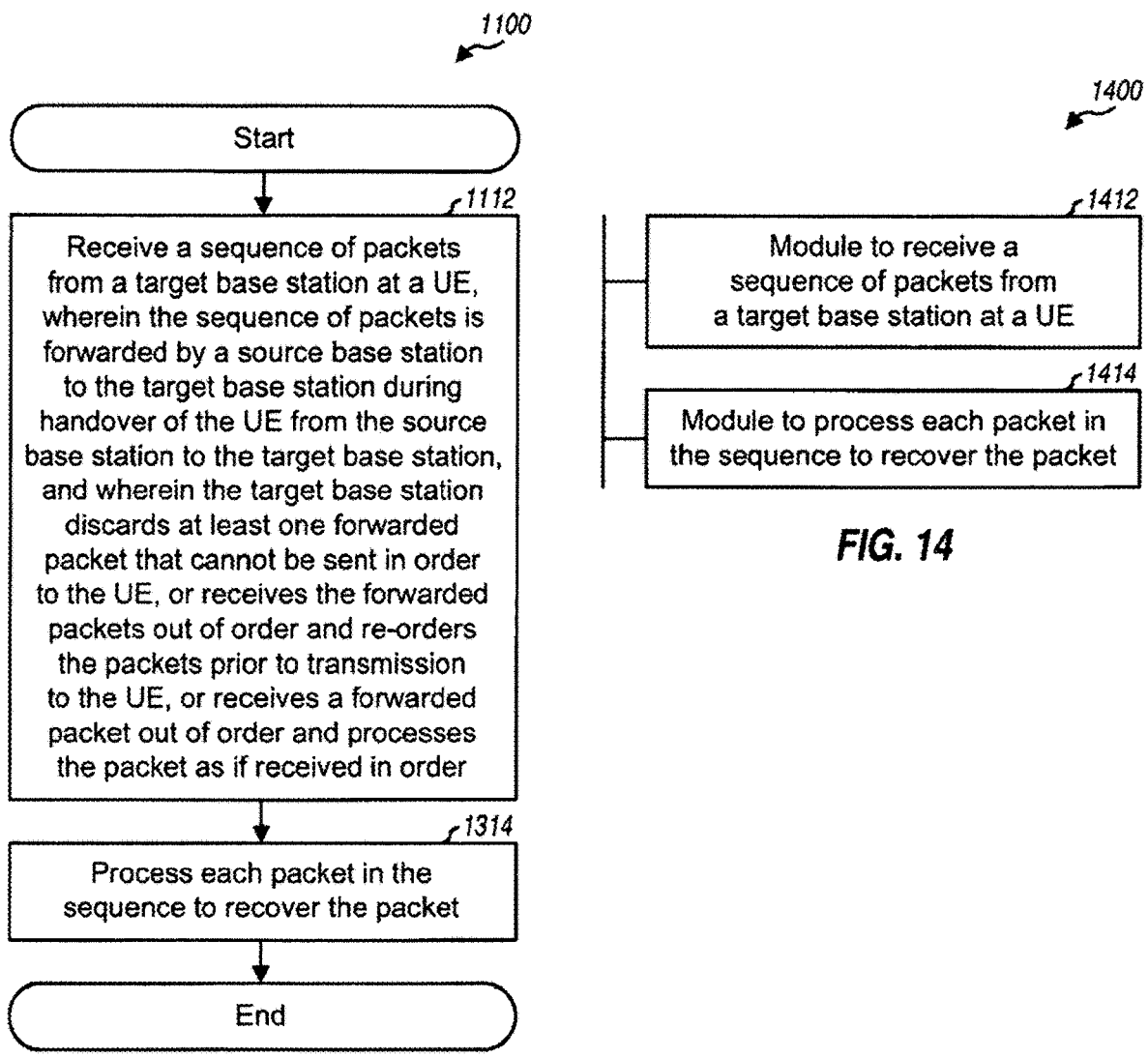

METHOD AND APPARATUS FOR HANDLING OUT-OF-ORDER PACKETS DURING HANDOVER IN A WIRELESS COMMUNICATION SYSTEM

The present application is a Divisional application that claims priority to U.S. Ser. No. 12/276,590, filed Nov. 24, 2008, entitled METHOD AND APPARATUS FOR HANDLING OUT-OF-ORDER PACKETS DURING HANDOVER IN A WIRELESS COMMUNICATION SYSTEM, which claims priority to provisional U.S. Application Ser. No. 60/990,589, filed Nov. 27, 2007, and provisional U.S. Application Ser. No. 60/990,906, filed Nov. 28, 2007, both entitled "METHODS AND APPARATUSES FOR MAINTAINING HYPER FRAME NUMBER SYNCHORNIZATION BETWEEN A TARGET ACCESS POINT AND USER EQUIPMENT AT HANDOVER," assigned to the assignee hereof and incorporated herein by reference.

BACKGROUND

I. Field

The present disclosure relates generally to communication, and more specifically to techniques for transmitting packets in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may be mobile and may be handed over from a source base station to a target base station when the UE moves about the system. During handover, the source base station may have packets of data that has not been successfully sent to the UE. It may be desirable to properly send these packets to the UE during handover.

SUMMARY

Techniques for sending packets and maintaining synchronization during handover is described herein. A UE may be handed over from a source base station to a target base station. The source base station may have packets for the UE and may forward these packets to the target base station. The target base station may receive the packets out of order, e.g., due to the packet-switched nature of the interface between the source and target base stations. If the target base station sends the packets out of order to the UE, then loss of synchronization may occur and/or the UE may be unable to recover the packets.

In one design, the target base station may determine whether each packet forwarded by the source base station can be sent in order to the UE. Each packet may have a sequence number that may be used to determine its order. The target base station may determine whether each forwarded packet can be sent in order to the UE based on the sequence number of that packet and the sequence number of the last packet sent to the UE. The target base station may send each packet that can be sent in order and may discard the packet otherwise. Radio resources may be saved by not sending packets that would be discarded by the UE.

In another design, the target base station may re-order packets received from the source base station within a re-ordering window and may send the re-ordered packets to the UE. The target base station may start a timer upon receiving the first packet from the source base station. The target base station may buffer the first packet if it is received out of order. The target base station may also buffer all subsequent packets received out of order from the source base station prior to expiration of the timer. The target base station may re-order and send the buffered packets after expiration of the timer. The re-ordering window may cover a period of time or a range of sequence numbers.

In yet another design, the target base station may receive a packet out of order from the source base station and may process the packet as if it is in order. The target base station may increment a hyper-frame number (HFN) due to the out-of-order packet and may cipher the packet with a count comprising the incremented HFN and the sequence number of the packet. Alternatively, target base station may re-assign the packet with a sequence number that is later than the sequence number of the last sent packet. In either case, the UE can correctly decipher the packet and avoid loss of synchronization. Upper layers at the UE may perform re-ordering of packets.

The techniques described herein may be used for packets forwarded from the source base station to the target base station during handover of the UE, as described above. In general, the techniques may be used for packets sent from a first entity (e.g., a source base station or a serving gateway) to a second entity (e.g., another base station) for transmission to a third entity (e.g., a UE). The packets may have sequence numbers and may be received out of order by the second entity. The second entity may process the packets using any of the designs described above.

Various aspects and features of the disclosure are described in further detail below.

BRIEF DESCRIPTION OF THE DRAWINGS

FIG. 7 shows a process for sending packets with packet discarding.

FIG. 8 shows an apparatus for sending packets with packet discarding.

FIG. 13 shows a process for receiving packets.

FIG. 14 shows an apparatus for receiving packets.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. 3GPP Long Term Evolution (LTE) utilizes an air interface defined by E-UTRA and a network architecture defined by E-UTRAN. E-UTRA employs OFDMA on the downlink and SC-FDMA on the uplink. UTRA, E-UTRA, E-UTRAN, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
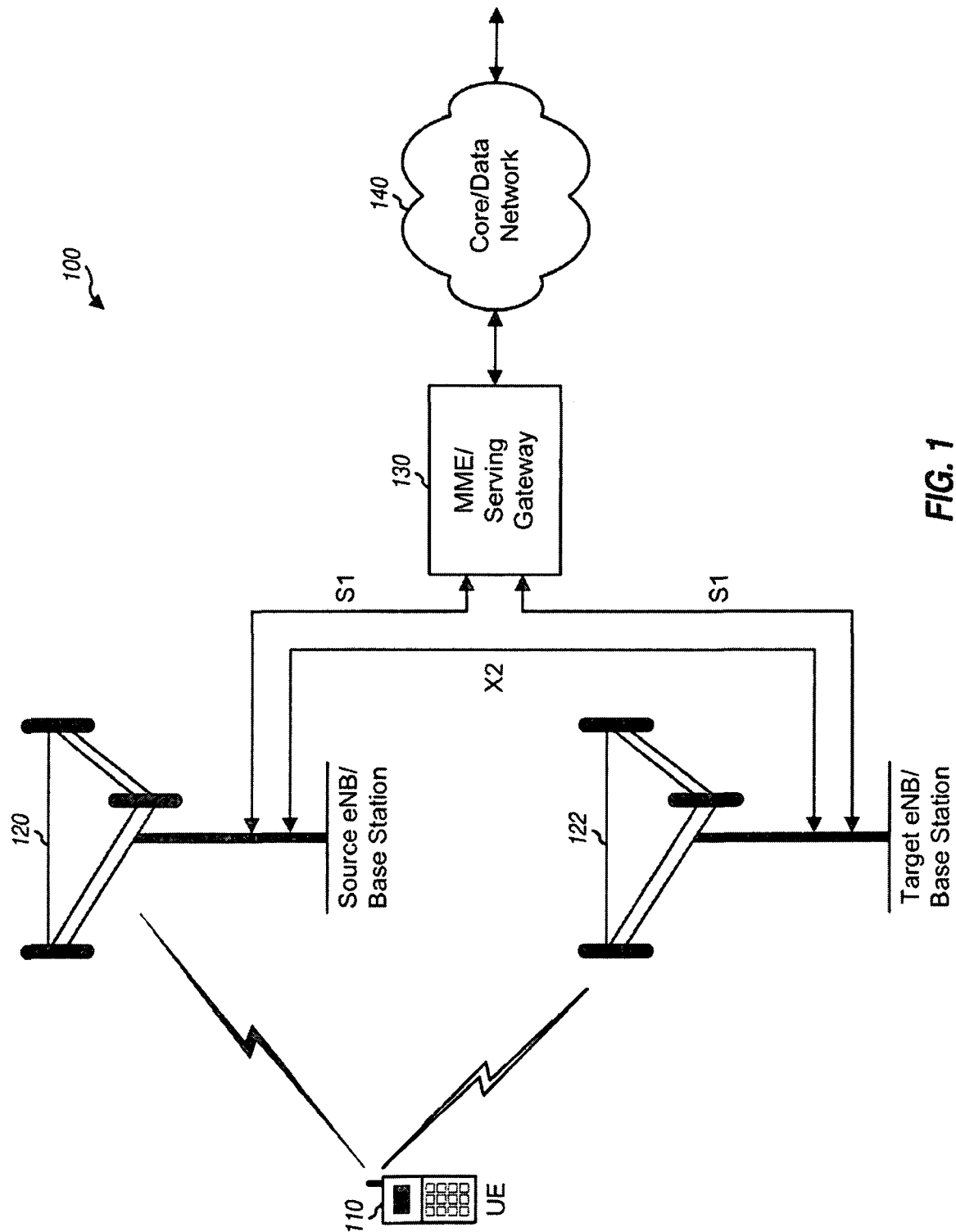
FIG. 1 shows a wireless communication system.

FIG. 1 shows a wireless communication system 100, which may be an LTE system. System 100 may include evolved Node Bs (eNBs) and other network entities described by 3GPP. For simplicity, only two eNBs 120 and 122 and one Mobility Management Entity (MME)/serving gateway 130 are shown in FIG. 1. An eNB may be a fixed station that communicates with the UEs and may also be referred to as a Node B, a base station, an access point, etc. Each eNB may provide communication coverage for a particular geographic area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area. eNBs 120 and 122 may communicate with each other via an X2 interface, which may be a logical or physical interface. eNBs 120 and 122 may also communicate with MME/serving gateway 130 via an S1 interface.

Serving gateway 130 may support data services such as packet data, Voice-over-Internet Protocol (VoIP), video, messaging, etc. MME 130 may be responsible for path switching between a source eNB and a target eNB at handover. MME/serving gateway 130 may couple to a core and/or data network 140 (e.g., the Internet) and may communicate with other entities (e.g., remote servers and terminals) that couple to core/data network 140.

A UE 110 may communicate with eNB 120 and/or eNB 122 via the downlink and uplink. The downlink (or forward link) refers to the communication link from an eNB to a UE, and the uplink (or reverse link) refers to the communication link from the UE to the eNB. UE 110 may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Figure 2:
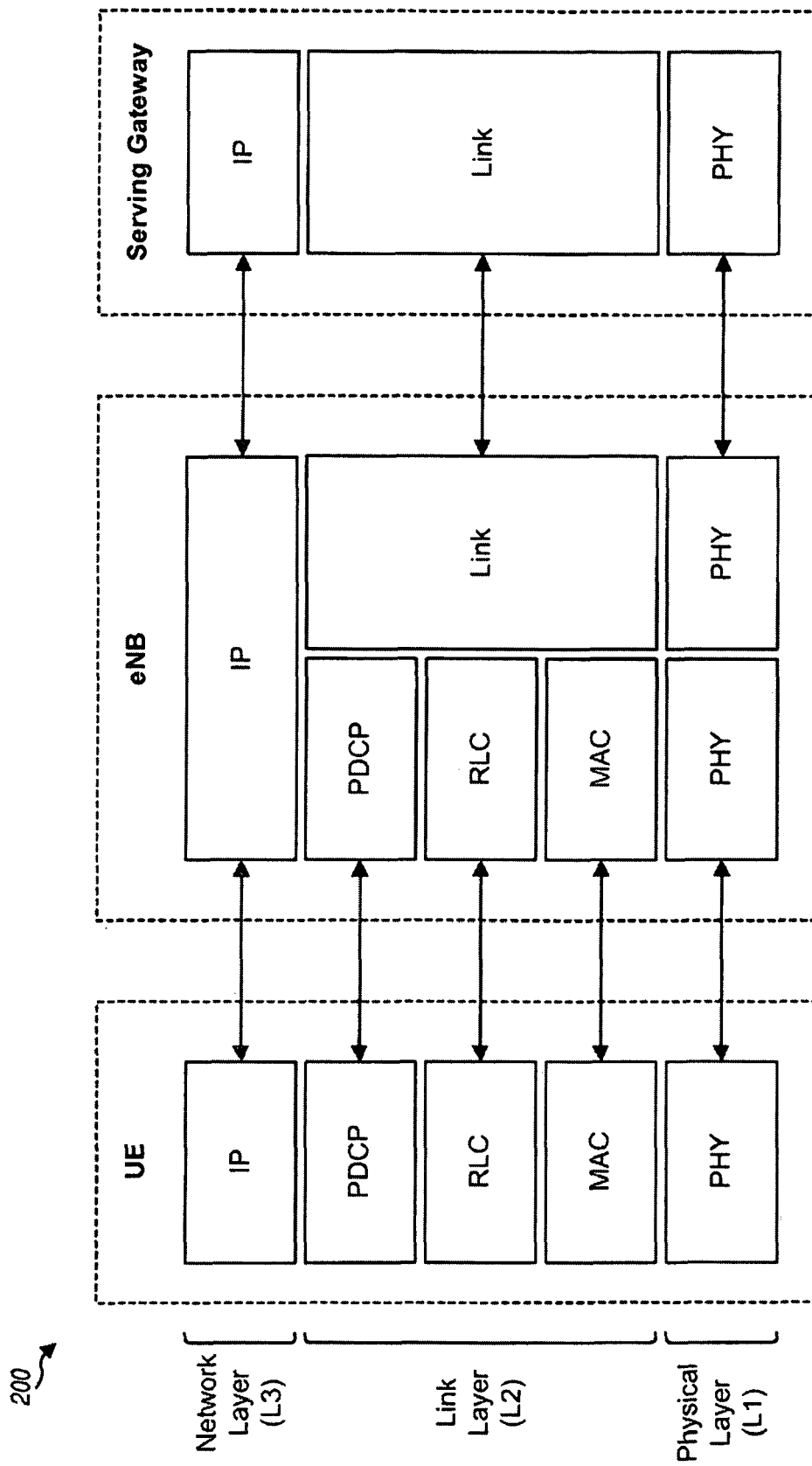
FIG. 2 shows example protocol stacks for different entities in the system.

FIG. 2 shows example protocol stacks 200 for a user plane in LTE. The user plane carries traffic data between UE 110 and serving gateway 130 via a serving eNB, which may be eNB 120 or 122 in FIG. 1. Each entity maintains a protocol stack for communication with another entity. Each protocol stack typically includes a network layer (Layer 3 or L3), a link layer (Layer 2 or L2), and a physical layer (Layer 1, L1 or PHY). The UE and the serving gateway may exchange data using IP at the network layer. Upper layer data for Transmission Control Protocol (TCP), User Datagram Protocol (UDP), Real-time Transport Protocol (RTP), and/or other protocols may be encapsulated in IP packets, which may be exchanged between the UE and the serving gateway via the serving eNB.

The link layer is typically dependent on network/radio technology. For the user plane in LTE, the link layer for the UE is composed of three sublayers for Packet Data Convergence Protocol (PDCP), Radio Link Control (RLC), and Medium Access Control (MAC), which are terminated at the serving eNB. The UE further communicates with the serving eNB via E-UTRA air-link interface at the physical layer. The serving eNB may communicate with the serving gateway via IP and a technology-dependent interface for the link and physical layers.

PDCP may perform various functions such as compression of upper layer protocol headers, ciphering/encryption and integrity protection of data for security, etc. RLC may perform various functions such as (i) segmentation and concatenation of RLC service data units (SDUs) and error correction through Automatic Repeat reQuest (ARQ) at a transmitter and (ii) duplicate detection of lower layer SDUs, re-ordering of RLC SDUs, and in-order delivery of upper layer protocol data units (PDUs) at a receiver. The functions performed by PDCP and RLC in LTE may be provided by equivalent protocols in other radio technologies. For example, an IP adaptation layer and a Radio Link Protocol (RLP) in cdma2000 may perform functions similar to those performed by PDCP and RLC, respectively.

PDCP is described in 3GPP TS 36.323, entitled "Evolved Universal Terrestrial Radio Access (E-UTRA); Packet Data Convergence Protocol (PDCP) Specification." RLC is described in 3GPP TS 36.322, entitled "Evolved Universal Terrestrial Radio Access (E-UTRA); Radio Link Control (RLC) Protocol Specification." These documents are publicly available.

Referring back to FIG. 1, UE 110 may initially communicate with eNB 120 for data exchanges with MME/serving gateway 130. UE 110 may be mobile and may be handed over from eNB 120 to eNB 122. For the handover, eNB 120 may be referred to as a source eNB, and eNB 122 may be referred to as a target eNB. After the handover, UE 110 may communicate with eNB 122 for data exchanges with MME/serving gateway 130. eNB 120 may be a serving eNB for UE 110 prior to the handover, and eNB 122 may be the serving eNB for UE 110 after the handover.

In the description herein, a handover or handoff may refer to a hand over from one eNB to another eNB as well as a hand over between different cells of the same eNB. A handover may be initiated by the system or a UE. The UE may initiate a handover in accordance with a forward handover procedure or may re-establish a radio connection with an appropriate eNB after experiencing outage. Furthermore, a handover may occur in order to support mobility of users in the system, to provide load balancing, to facilitate reconfigurations of radio connection, to facilitate handling of unforeseeable error cases, etc. The system may also initiate a handover for any of the reasons mentioned above.

Figure 3:
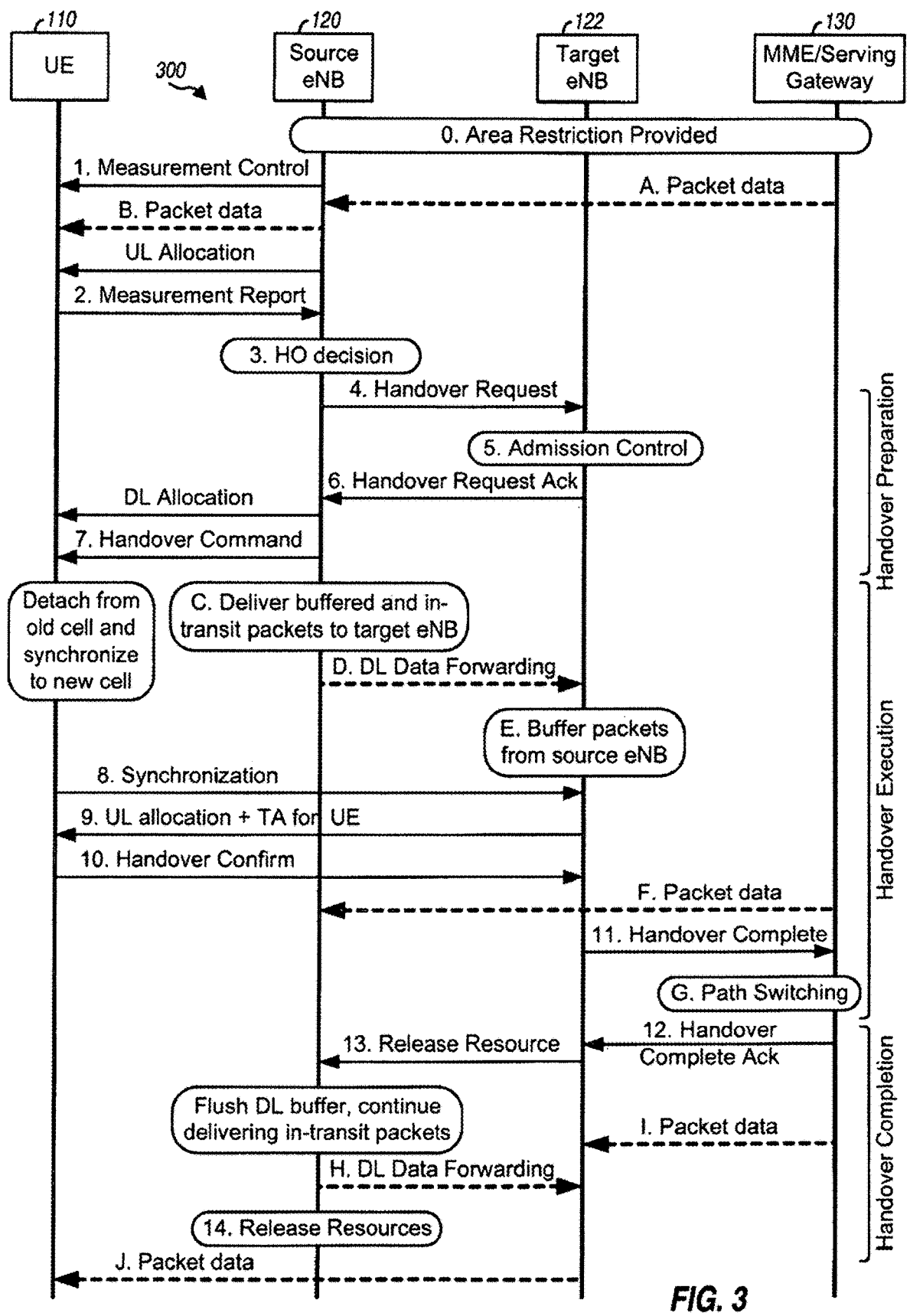
FIG. 3 shows an example call flow for handover.

FIG. 3 shows an example call flow 300 for handover of UE 110 from source eNB 120 to target eNB 122. The source eNB may configure measurement procedures for the UE (step 1), and the UE may send measurement reports to the source eNB (step 2). The source eNB may make a decision to handover (HO) the UE (step 3) and may issue a Handover Request message to the target eNB (step 4). The target eNB may perform admission control and may accept handover of the UE (step 5). The target eNB may return a Handover Request Acknowledgement (Ack) message to the source eNB (step 6). The source eNB may then send a Handover Command message to the UE (step 7).

Prior to handover, the source eNB may receive packets for the UE from the serving gateway (step A) and may send the packets to the UE (step B). After sending the Handover Command message in step 7, the source eNB may forward buffered packets for the UE to the target eNB (steps C and D). The forwarded packets may include packets that have not been sent to the UE as well as packets that are in transit, e.g., packets sent but not successfully received by the UE. The target eNB may buffer the packets received from the source eNB (step E).

Upon receiving the Handover Command message in step 7, the UE may detach from the source eNB, perform synchronization to the target eNB, and start acquiring uplink timing advance (step 8). The target eNB may respond with resource allocation and timing advance (TA) for the UE (step 9). Once the UE has successfully accessed the target eNB, the UE may send a Handover Confirm message to the target eNB to indicate that the handover procedure is completed for the UE (step 10).

The target eNB may send a Handover Complete message to inform the MME/serving gateway that the UE has changed eNB (step 11). The MME/serving gateway may then switch the data path or connection for the UE from the source eNB to the target eNB (step G). The MME/serving gateway may also return a Handover Complete Ack message to the target eNB (step 12). The target eNB may send a Release Resource message to the source eNB to indicate successful handover of the UE (step 13). The source eNB may release resources for the UE upon receiving the Release Resource message.

Prior to receiving the Handover Complete message in step 11, the serving gateway may continue to send packets for the UE to the source eNB (step F). The source eNB may continue to forward packets for the UE to the target eNB (step H). After receiving the Handover Complete message in step 11, the serving gateway may send packets for the UE to the target eNB (step I). The target eNB may send the packets forwarded from the source eNB and the packets received from the serving gateway to the UE (step J).

FIG. 3 shows an example call flow for handover of the UE from the source eNB to the target eNB. Handover of the UE may also be performed with other call flows.

Figure 4:
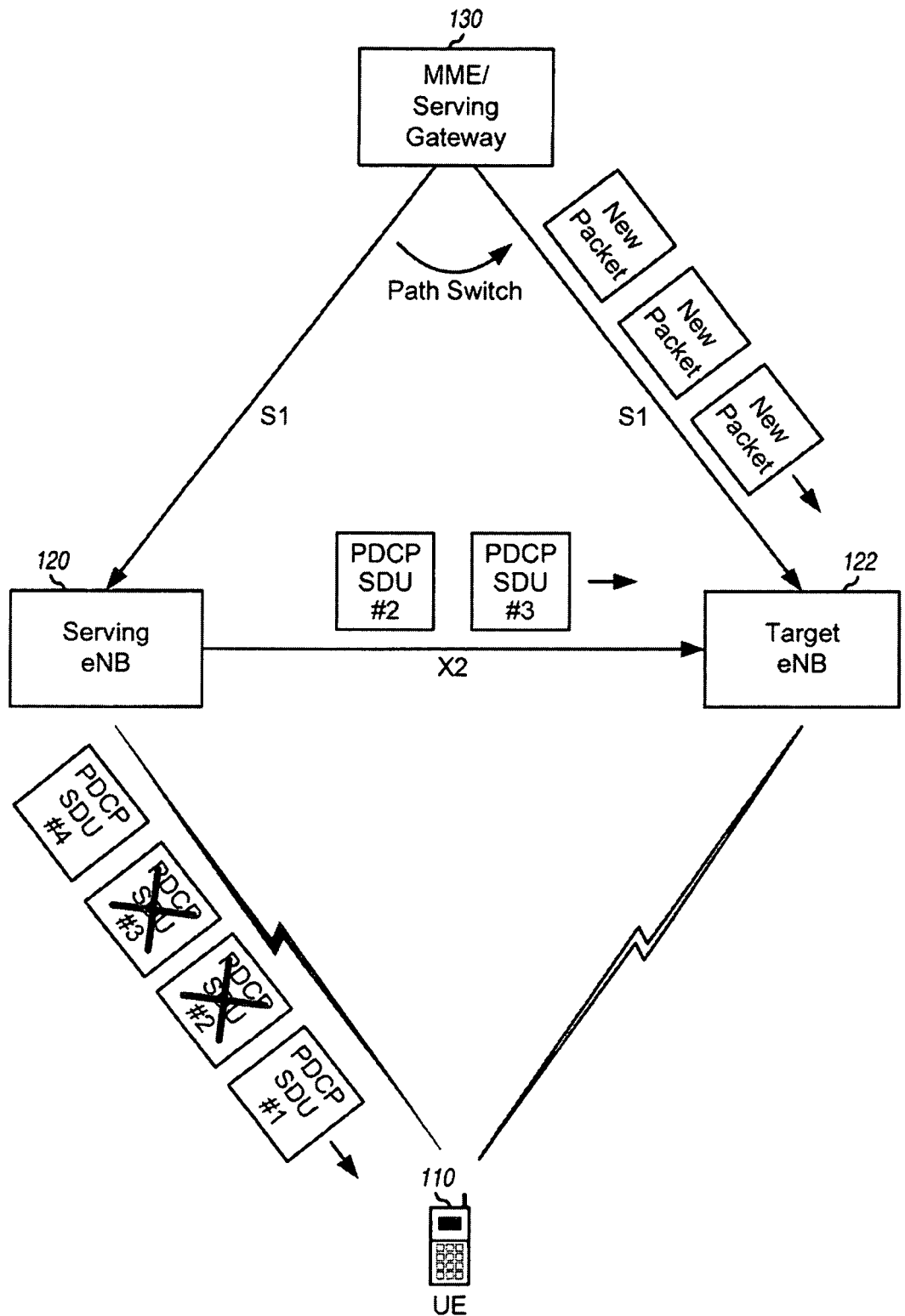
FIG. 4 shows data transmission and data forwarding during handover.

FIG. 4 shows an example of data transmission and data forwarding during handover. Prior to the handover, the serving gateway may send packets for the UE to the source eNB via the S1 interface (steps A and F in FIG. 3). The source eNB may receive the packets as PDCP SDUs and may assign a PDCP sequence number (SN) to each PDCP SDU. In the description herein, PDCP SDU #k denotes a PDCP SDU with a PDCP SN of k. The source eNB may process and send each PDCP SDU to the UE (step B in FIG. 3).

At some point during the handover, the data path for the UE may be switched from the source eNB to the target eNB (step G in FIG. 3). From this point onward, the serving gateway may send new packets for the UE to the target eNB via the S1 interface (step I in FIG. 3). The target eNB may receive the packets as PDCP SDUs and may assign a PDCP SN to each PDCP SDU. The target eNB may process and send each PDCP SDU to the UE (step J in FIG. 3).

During handover, the source eNB may have (i) pending PDCP SDUs that have not yet been sent to the UE and/or (ii) in-transit PDCP SDUs that have been sent to the UE but not correctly decoded by the UE. The source eNB may forward the pending and in-transit PDCP SDUs to the target eNB via the X2 interface (steps D and H in FIG. 3). The target eNB may receive the forwarded PDCP SDUs out of order, e.g., due to the packet-switched nature of the X2 interface. The serving gateway may send new packets in order to the target eNB. The target eNB may also receive the new packets out of order, e.g., due to the packet-switched nature of the S1 interface.

In the example shown in FIG. 4, the PDCP SDUs may be ordered such that PDCP SDU #1 is the earliest PDCP SDU and PDCP SDU #4 is the latest PDCP SDU. The source eNB may send PDCP SDUs #1 through #4 in order to the UE. The UE may decode PDCP SDU #1 correctly, decode PDCP SDUs #2 and #3 in error, and decode PDCP SDU #4 correctly. The UE may correctly decode PDCP SDU #4, but not PDCP SDUs #2 and #3, due to early HARQ termination of PDCP SDU #4. The source eNB may forward PDCP SDUs #2 and #3 to the target eNB. The target eNB may receive PDCP SDU #3 before PDCP SDU #2. The target eNB may then send PDCP SDU #2 and/or PDCP SDU #3 to the UE prior to the new packets from the serving gateway.

Figures 5A, 5B:
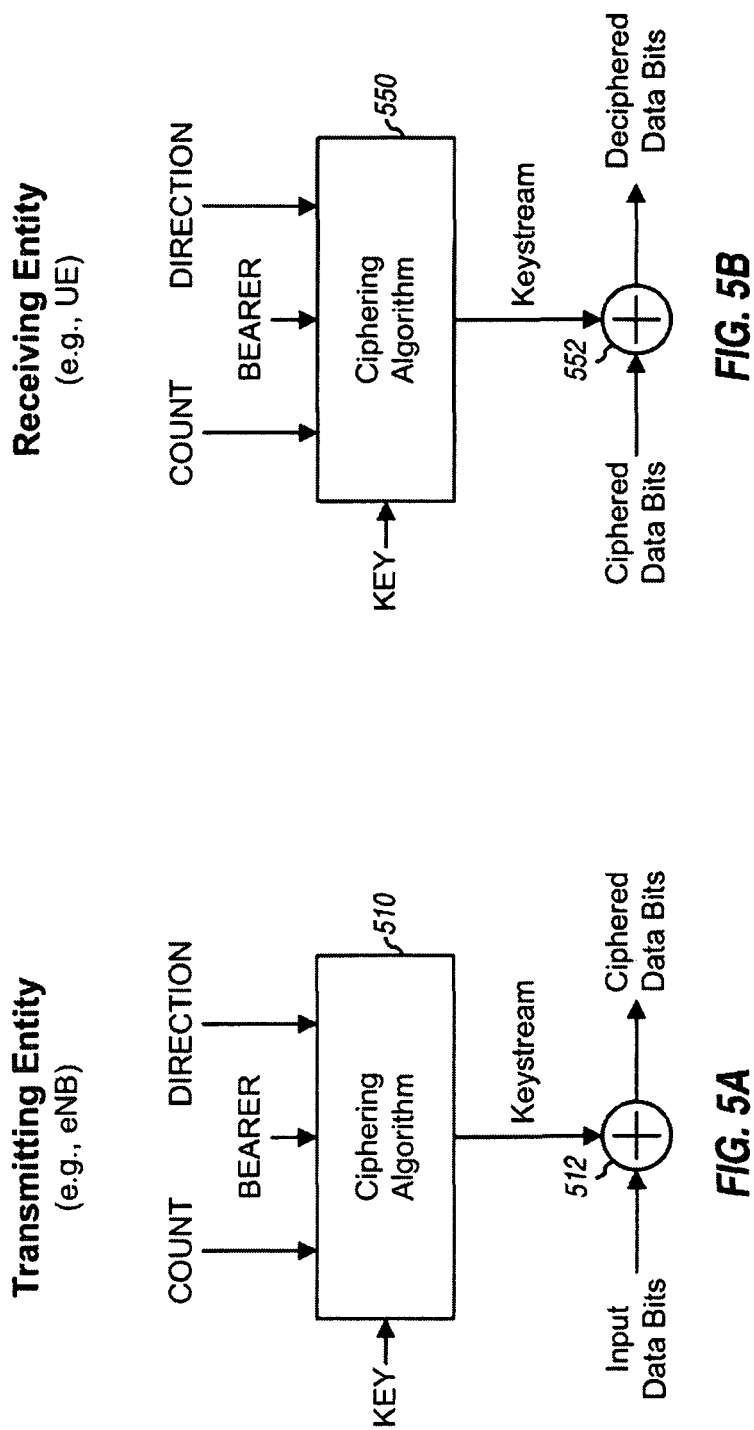
FIG. 5A shows ciphering at a transmitting entity.
FIG. 5B shows deciphering at a receiving entity.

FIG. 5A shows ciphering of a PDCP SDU at a transmitting entity, which may be the serving eNB for downlink transmission or the UE for uplink transmission. A unit 510 may receive parameters such as KEY, COUNT, BEARER and DIRECTION. The KEY parameter may comprise a cipher key used for ciphering data. The COUNT parameter may be a crypto-sync that may act as a time-variant input for a ciphering algorithm. The BEARER parameter may indicate a radio bearer of the data being ciphered. The DIRECTION parameter may comprise a bit that may be set to '0' for uplink transmission or to '1' for downlink transmission. Unit 510 may generate a keystream based on all of the parameters and in accordance with the ciphering algorithm defined by LTE. An exclusive-OR gate 512 may perform bit-wise modulo-2 addition of the keystream bits from unit 510 and input data bits for a PDCP SDU and may provide ciphered data bits for the PDCP SDU.

FIG. 5B shows deciphering of a PDCP SDU at a receiving entity, which may be the UE for downlink transmission or the serving eNB for uplink transmission. A unit 550 may receive the KEY, COUNT, BEARER and DIRECTION parameters. Unit 550 may generate a keystream based on all of the parameters and in the same manner as unit 510 at the transmitting entity. An exclusive-OR gate 552 may perform bit-wise modulo-2 addition of the keystream bits from unit 550 and the ciphered data bits for a PDCP SDU and may provide deciphered data bits for the PDCP SDU.

Figure 6A:
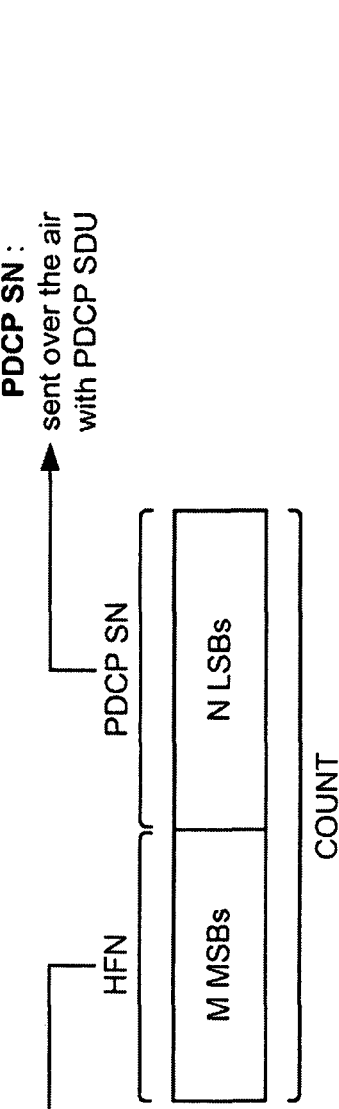
FIG. 6A shows a COUNT parameter used for ciphering and deciphering.

FIG. 6A shows a design of the COUNT parameter in LTE. The COUNT is a 32-bit value composed of an M-bit HFN and an N-bit PDCP SN, where M and N may be configurable values. The HFN occupies the M most significant bits (MSBs) of the COUNT, and the PDCP SN occupies the N least significant bits (LSBs) of the COUNT. In one configuration, the 32-bit COUNT is composed of a 20-bit HFN and a 12-bit PDCP SN. In another configuration, the 32-bit COUNT is composed of a 25-bit HFN and a 7-bit PDCP SN. For both configurations, the PDCP SN is sent over the air with each PDCP SDU. The HFN is not sent over the air in order to reduce overhead.

Figure 6B:
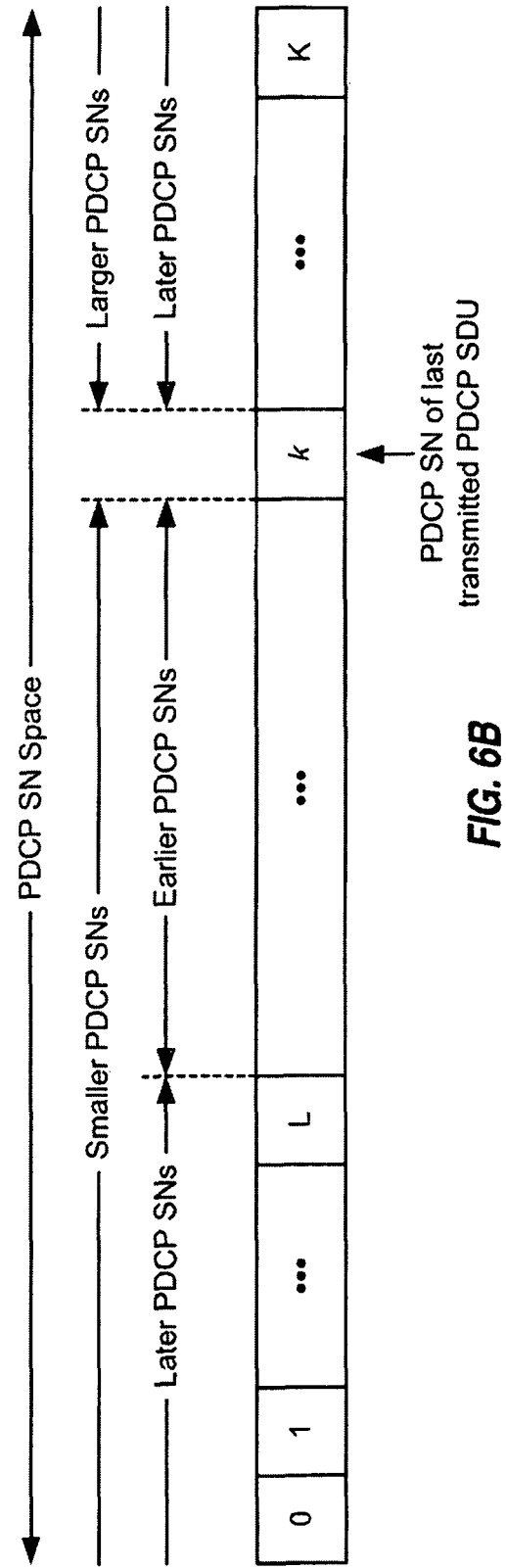
FIG. 6B shows a sequence number space.

FIG. 6B shows a PDCP SN space, which may cover a range of 0 to K, where $K=2^N-1$. For example, K may be equal to 127 for a 7-bit PDCP SN or equal to 4095 for a 12-bit PDCP SN. A PDCP SDU may have a PDCP SN of k, which may be within the range of 0 to K. The PDCP SN may be incremented for each new PDCP SDU until it reaches the maximum value of K and may then wrap around to 0.

For a PDCP SN of k, a portion of the PDCP SN space may be considered as being "later" than k, and the remaining portion of the PDCP SN space may be considered as being "earlier" than k. For example, PDCP SNs of k+1 to L may be considered as being later than PDCP SN of k, and PDCP SNs of L+1 to k−1 may be considered as being earlier than PDCP SN of k, as shown in FIG. 6B. L may be defined as L=(k+K/2) mod K, so that half of the PDCP SN space is later than k, and the other half of the PDCP SN space is earlier than k. L may also be defined in other manners.

As also shown in FIG. 6B, PDCP SNs of 0 through k−1 may be considered as being "smaller" than k. PDCP SNs of k+1 to K may be considered as being "larger" than k.

The UE may access eNB 120 and may establish radio bearers for communication with the eNB. The UE and the eNB may each reset the COUNT to zero when the radio bearers are established. The eNB may increment the PDCP SN whenever a new PDCP SDU is received from the serving gateway and may increment the HFN whenever the PDCP SN wraps around to zero after reaching the maximum value of K. The eNB may send each PDCP SDU and its PDCP SN to the UE. The UE may receive the PDCP SDU from the eNB and may update the HFN based on the PDCP SN.

The UE may be handed over from source eNB 120 to target eNB 122. For the handover, the source eNB may send pertinent state information, such as the current HFN and the current PDCP SN, to the target eNB. The target eNB may assign PDCP SNs to new PDCP SDUs received from the serving gateway starting with the current PDCP SN and HFN received from the source eNB. The UE may maintain the COUNT through the handover and may update the HFN based on the PDCP SNs of the PDCP SDUs received from the target eNB.

The PDCP specification in LTE is written with an assumption that PDCP SDUs with increasing PDCP SNs are passed to lower layer at a transmitting entity. A receiving entity may assume that the lower layer will deliver PDCP SDUs in the proper order. The receiving entity may thus increment the HFN whenever the PDCP SN of a newly received PDCP SDU is smaller than the PDCP SN of the last received PDCP SDU.

A conventional processing scheme for data transmission on the downlink based on the assumptions described above may be as follows. The serving eNB may assign a PDCP SN to each PDCP SDU received from the serving gateway. The eNB may increment the PDCP SN after each PDCP SDU and may increment the HFN whenever the PDCP SN wraps around to zero. The eNB may cipher each PDCP SDU with a COUNT formed by the HFN maintained by the eNB and the PDCP SN of that PDCP SDU, as shown in FIG. 5A. The eNB may transmit each PDCP SDU in the proper order to the UE. The UE may receive the PDCP SDUs from the eNB in the proper order. The UE may increment the HFN whenever it receives a PDCP SDU with a smaller PDCP SN than that of the last PDCP SDU. The UE may decipher each received PDCP SDU with a COUNT formed by the HFN maintained by the UE and the PDCP SN obtained from the received PDCP SDU.

The conventional processing scheme described above may result in errors during handover of the UE from the source eNB to the target eNB. At handover, the source eNB may forward PDCP SDUs via the X2 (or S1) interface to the target eNB. Because the X2 (or S1) interface is not a circuit-switched interface, the forwarded PDCP SDUs may arrive out of order at the target eNB, e.g., as shown in FIG. 4. If the target eNB processes each forwarded PDCP SDU as it is received from the source eNB, then reception of PDCP SDUs out of order at the target eNB may result in deciphering error and/or loss of HFN synchronous at the UE.

For the example shown in FIG. 4, the target eNB may receive PDCP SDU #3 from the source eNB and may cipher this PDCP SDU with a COUNT formed by the HFN and a PDCP SN of 3. This COUNT may be denoted as (HFN|3). The target eNB may pass the ciphered PDCP SDU #3 to lower layer for transmission to the UE. The target eNB may thereafter receive PDCP SDU #2 out of order from the source eNB. The target eNB may cipher PDCP SDU #2 with (HFN|2), which is the correct COUNT for this PDCP SDU. However, for the conventional processing scheme described above, the UE may increment its HFN when it receives PDCP SDU #2 after receiving PDCP SDU #3. The UE may then decipher PDCP SDU #2 with (HFN+1|2) and would decipher the PDCP SDU in error since the target eNB used (HFN|2). Furthermore, the UE would be out of HFN synchronization since it would use HFN+1 for deciphering subsequent PDCP SDUs while the target eNB would continue to use HFN for ciphering. Subsequent PDCP SDUs may thus be deciphered in error by the UE.

The UE may maintain a duplicate-discard window to avoid getting out of HFN synchronization. The start of the window may be placed at the last PDCP SDU delivered to upper layers, and the end of the window may be placed at the latest PDCP SDU not yet delivered to upper layers. The UE may use the duplicate-discard window to determine whether to process and deliver a PDCP SDU to upper layers or to discard the PDCP SDU.

For the example shown in FIG. 4, the UE may correctly decode PDCP SDUs #1 and #4 but not PDCP SDUs #2 and #3. The UE may deliver PDCP SDU #1 to upper layers and may buffer PDCP SDU #4. The UE may then receive PDCP SDU #3 from the target eNB and may correctly decode this PDCP SDU. The UE may assume that PDCP SDUs are sent in order by the target eNB and may assume that PDCP SDU #2 is lost. The UE may then deliver PDCP SDUs #3 and #4 to upper layers and may move the start of the duplicate-discard window to PDCP SDU #4. The UE may thereafter receive PDCP SDU #2 from the target eNB. The UE may recognize that this PDCP SDU is outside the duplicate-discard window and may discard the PDCP SDU. The UE may maintain the HFN instead of incrementing it. This UE processing scheme may avoid loss of HFN synchronization. However, radio resources are wasted by sending out-of-order PDCP SDUs that the UE would discard.

Various processing schemes may be used to handle out-of-order packets and avoid loss of HFN synchronization at the UE. These processing schemes may be used during handover when the target eNB may receive forwarded PDCP SDUs from the source eNB out of order.

In a first processing scheme, the target eNB may discard PDCP SDUs that it cannot send in order to the UE. The target eNB may process and send PDCP SDUs as they are received and does not attempt to re-order these PDCP SDUs.

Instead, if the target eNB receives a forwarded PDCP SDU with an earlier PDCP SN than that of a PDCP SDU that has been sent to the UE, then the target eNB would discard the forwarded PDCP SDU and not send it to the UE. The target eNB may maintain a pointer for the PDCP SN of the latest PDCP SN sent to the UE. The target eNB may compare the PDCP SN of a forwarded PDCP SDU against this pointer to determine whether or not the PDCP SDU can be sent in order to the UE.

For the example shown in FIG. 4, the target eNB may receive PDCP SDU #3 from the source eNB, cipher this PDCP SDU with (HFN|3), and send the ciphered PDCP SDU to the UE. The target eNB may set the pointer to 3. The target eNB may thereafter receive PDCP SDU #2 from the source eNB and may compare the PDCP SN of 2 against the pointer. The target eNB may discard this PDCP SDU since its PDCP SN of 2 is earlier than the PDCP SN of 3 of the transmitted PDCP SDU.

The first processing scheme may simplify operation of the target eNB. This processing scheme may also save radio resources since the target eNB does not send out-of-order PDCP SDUs that the UE would discard using the duplicate-discard window described above.

In a second processing scheme, the target eNB may perform re-ordering of forwarded PDCP SDUs for a short period of time or a small range of PDCP SNs. This short time period or small PDCP SN range may be referred to as a re-ordering window.

For a time-based re-ordering window, the target eNB may use a timer to keep track of time and may start the timer upon receiving the first forward PDCP SDU from the source eNB. The target eNB may buffer all forwarded PDCP SDUs received out of order from the source eNB while the timer is active. When the timer expires, the target eNB may re-order all buffered PDCP SDUs and may cipher and send each re-ordered PDCP SDU to the UE. The re-ordering window may be used to receive PDCP SDUs that are earlier than the first forwarded PDCP SDU from the source eNB.

For the example shown in FIG. 4, the target eNB may receive PDCP SDU #3 from the source eNB, buffer this PDCP SDU, and start the timer. The target eNB may thereafter receive PDCP SDU #2 from the source eNB and may also buffer this PDCP SDU. When the timer expires, the target eNB may re-order PDCP SDUs #2 and #3. The target eNB may then process and send PDCP SDU #2 and then process and send PDCP SDU #3. Alternatively, upon receiving PDCP SDU #2, the target eNB may re-order, cipher, and send PDCP SDUs #2 and #3 to the UE, instead of waiting for the timer to expire. The processing by the target eNB may be dependent on the state information available to the target eNB. In any case, the UE may be able to receive PDCP SDUs #2 and #3 in order from the target eNB.

In one design, the target eNB may start the timer for only the first forwarded PDCP SDU from the source eNB. The target eNB may operate in the same manner as in the first processing scheme after the timer expires. In this design, if the target eNB thereafter receives a forwarded PDCP SDU that is earlier than a transmitted PDCP SDU, then the target eNB may simply discard the forwarded PDCP SDU. For the example shown in FIG. 4, if the target eNB receives PDCP SDU #2 after expiration of the timer, then the target eNB may discard this PDCP SDU.

In another design, the target eNB may start the timer for the first forwarded PDCP SDU and also when a forwarded PDCP SDU with a non-consecutive PDCP SN is received from the source eNB. For example, the target eNB may send PDCP SDU #2 and #3 after expiration of the timer and may thereafter receive PDCP SDU #6 from the source eNB. The target eNB may then start the timer and wait for PDCP SDU #5 from the source eNB.

For a PDCP SN-based re-ordering window, the target eNB may set the end of the window to the last PDCP SDU sent to the UE. The re-ordering window may span a predetermined number of PDCP SNs or all pending and in-transit PDCP SDUs. The target eNB may advance the re-ordering window whenever a later PDCP SDU is received from the source eNB. The target eNB may process and send a PDCP SDU at the start of the re-ordering window.

For the example shown in FIG. 4, the re-ordering window may cover PDCP SDUs #2 and #3. If the target eNB receives PDCP SDU #2 from the source eNB, then the target eNB may process and send this PDCP SDU and advance the window. If the target eNB receives PDCP SDU #3 from the source eNB, then the target eNB may maintain the window and wait for PDCP SDU #2. If the target eNB receives PDCP SDU #5 from the source eNB, then the target eNB may advance the window since the likelihood of receiving PDCP SDU #2 may be reduced.

For the second processing scheme, the re-ordering window duration may be selected based on a tradeoff between latency and data loss. A wider re-ordering window may ensure that more PDCP SDUs received out of order from the source eNB can be sent to the UE but may also result in a longer delay in sending the PDCP SDUs to the UE. Conversely, a shorter re-ordering window may result in a shorter delay in sending the PDCP SDUs but may also result in more PDCP SDUs being discarded.

In a third processing scheme, the target eNB may update the HFN in the same manner as the UE in order to avoid loss of HFN synchronization. For the conventional processing scheme described above, the UE may assume that PDCP SDUs are sent in order and may increment the HFN whenever a PDCP SDU with a smaller PDCP SN is received. The target eNB may also increment the HFN whenever a forwarded PDCP SDU with a smaller PDCP SN is received from the source eNB.

For the third processing scheme, the target eNB may process (e.g., cipher) each forwarded PDCP SDU received from the source eNB and may send the PDCP SDU to the UE. The target eNB may process and send each forwarded PDCP SDU as it is received from the source eNB, without buffering the PDCP SDU at the target eNB. The target eNB may increment the HFN whenever a forwarded PDCP SDU with a smaller PDCP SN is received from the source eNB. The target eNB may then cipher the forward PDCP SDU with the updated HFN.

For the example shown in FIG. 4, the target eNB may receive PDCP SDU #3 from the source eNB, cipher this PDCP SDU with (HFN|3), and send the ciphered PDCP SDU to the UE. The target eNB may thereafter receive PDCP SDU #2 from the source eNB. The target eNB may increment the HFN in response to receiving a smaller PDCP SN and in anticipation of the UE incrementing its HFN. The target eNB may then cipher PDCP SDU #2 with (HFN+1|2) and send the ciphered PDCP SDU to the UE. The UE may increment its HFN in response to receiving the ciphered PDCP SDU #2 and may deciphered this PDCP SDU with (HFN+1|2). The UE may be able to correctly decipher PDCP SDU #2, even though it is sent out of order, due to the target eNB updating the HFN in the same manner as the UE. The UE may deliver the deciphered PDCP SDU #2 out of order to upper layers since this PDCP SDU has a COUNT of (HFN+1|2) whereas the deciphered PDCP SDU #3 has a COUNT of (HFN|3).

It may be desirable for the UE to deliver PDCP SDUs out of order to upper layers instead of discarding these PDCP SDUs. The upper layers may utilize a protocol (e.g., TCP or RTP) that can re-order data and provide the data in order to end applications. Furthermore, out-of-order PDCP SDUs may occur infrequently. It may be acceptable to deliver the PDCP SDUs out of order to upper layers as long as the HFN is kept in synchronization.

In a fourth processing scheme, the target eNB may re-assign forwarded PDCP SDUs with new PDCP SNs, as needed, in order to avoid loss of HFN synchronization. For this processing scheme, the target eNB may process and send each forwarded PDCP SDU as it is received from the source eNB, without buffering the PDCP SDU. If the target eNB receives a forwarded PDCP SDU that is earlier than a PDCP SDU already transmitted to the UE, then the target eNB may re-assign this PDCP SDU with a new PDCP SN that is later than the PDCP SN of the transmitted PDCP SDU.

For the example shown in FIG. 4, the target eNB may receive state information indicating that PDCP SN of 4 was the last PDCP SN used by the source eNB. The target eNB may receive PDCP SDU #3 from the source eNB, cipher this PDCP SDU with (HFN|3), and send the ciphered PDCP SDU to the UE. The target eNB may thereafter receive PDCP SDU #2 from the source eNB. The target eNB may re-assign this PDCP SDU with a PDCP SN of 5, cipher this PDCP SDU with (HFN|5), and send the ciphered PDCP SDU to the UE. If the target eNB thereafter receives PDCP SDU #5 from the source eNB, then the target eNB may re-assign this PDCP SDU with a PDCP SN of 6, cipher the PDCP SDU with (HFN|6), and send the ciphered PDCP SDU to the UE. The target eNB may thus re-assign each forwarded PDCP SDU from the source eNB in the same manner and may process and send the PDCP SDU to the UE.

The target eNB may re-assign PDCP SNs to forwarded PDCP SDUs that are received out of order from the source eNB. This re-assignment of PDCP SNs may allow the UE to correctly decipher the PDCP SDUs while maintaining HFN synchronization. The UE may deliver the PDCP SDUs out of order to upper layers, which may be acceptable or desirable as described above. The target eNB may assign sequentially increasing PDCP SNs to new packets received from the serving gateway.

The four processing schemes described above may avoid loss of HFN synchronization. The target eNB may receive forwarded PDCP SDUs from the source eNB and may send these PDCP SDUs using any one of the four processing schemes described above. All four processing schemes would allow the UE to correctly decipher each PDCP SDU and maintain HFN synchronization with the target eNB. The first and second processing schemes may allow the UE to deliver PDCP SDUs in order to upper layers. The third and fourth processing schemes may result in PDCP SDUs being delivered out of order to upper layers at the UE, which may be acceptable. HFN synchronization may also be achieved with other processing schemes.

For clarity, the processing schemes have been described for PDCP SDUs in LTE. In general, these processing schemes may be used for packets at any layer in a protocol stack and for any protocol. Also for clarity, the processing schemes have been described for handover of the UE from the source eNB to the target eNB. These processing schemes may also be used for packets sent from the serving gateway to the serving eNB. The packets may be assigned sequence numbers, e.g., by a GPRS Tunneling Protocol (GTP). The serving eNB may process the packets from the serving gateway in similar manner as PDCP SDUs forwarded from another eNB.

FIG. 7 shows a design of a process 700 for sending packets in a wireless communication system. Process 700 may be performed by a transmitter, which may be a base station/eNB for data transmission on the downlink or a UE for data transmission on the uplink. A sequence of packets may be received from a first entity at a second entity, e.g., via a packet-switched interface (block 812). Whether each packet in the sequence can be sent in order to a third entity may be determined (block 814). Each packet that can be sent in order may be sent to the third entity (block 816). Each packet that cannot be sent in order may be discarded (block 818). Each packet in the sequence may be either processed and sent or discarded as the packet is received from the first entity, without buffering the packet at the second entity.

In one design, the first entity may be a source base station/eNB, the second entity may be a target base station/eNB, and the third entity may be a UE. Blocks 812 to 818 may be performed by the target base station during handover of the UE from the source base station to the target base station. In another design, the first entity may be a serving gateway, the second entity may be a base station, and the third entity may be a UE. The packets may comprise PDCP SDUs or some other type of packets.

In one design of block 812, a pointer may be maintained for a sequence number of a latest packet sent to the third entity. Whether a packet can be sent in order may be determined based on the sequence number of that packet and the pointer. A packet cannot be sent in order if it has an earlier sequence number than the sequence number of a packet already sent to the third entity.

FIG. 8 shows a design of an apparatus 800 for sending packets in a wireless communication system. Apparatus 800 includes a module 812 to receive a sequence of packets from a first entity at a second entity, a module 814 to determine whether each packet in the sequence can be sent in order to a third entity, a module 816 to send to the third entity each packet that can be sent in order, and a module 818 to discard each packet that cannot be sent in order.

Figure 9:
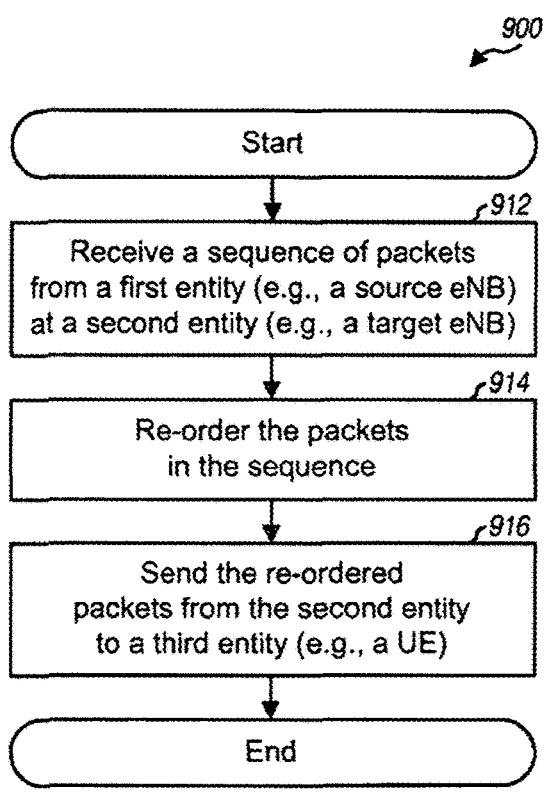
FIG. 9 shows a process for sending packets with re-ordering.

FIG. 9 shows a design of a process 900 for sending packets in a wireless communication system. A sequence of packets may be received from a first entity at a second entity, e.g., via a packet-switched interface (block 912). The packets in the sequence may be re-ordered (block 914). The re-ordered packets may be sent from the second entity to a third entity (block 916).

In one design, the first entity may be a source base station, the second entity may be a target base station, and the third entity may be a UE. Blocks 912 to 916 may be performed by the target base station during handover of the UE from the source base station to the target base station. In another design, the first entity may be a serving gateway, the second entity may be a base station, and the third entity may be a UE. The packets may comprise PDCP SDUs or some other type of packets.

In one design, the sequence of packets may be received by the second entity during a time period determined by a re-ordering window. In one design of block 914, a timer may be started in response to receiving a first packet in the sequence from the first entity. The first packet may be buffered if it is not received in order. Subsequent packets not received in order from the first entity prior to expiration of the timer may also be buffered. The buffered packets may be re-ordered and sent after expiration of the timer. Each packet received from the first entity after expiration of the timer may be processed and sent without buffering at the second entity.

Figure 10:
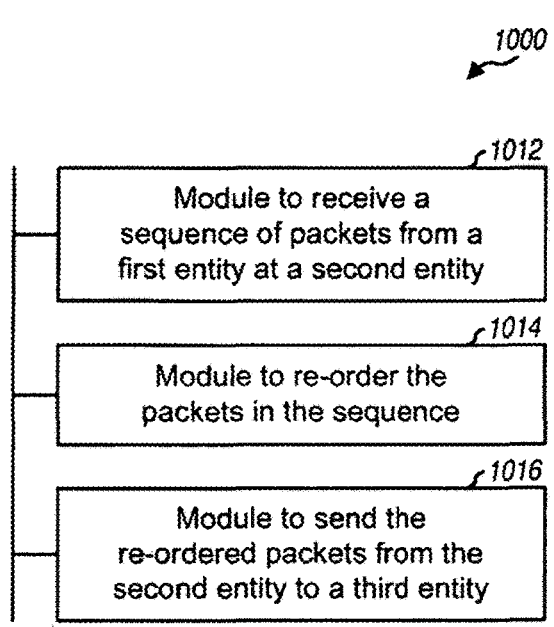
FIG. 10 shows an apparatus for sending packets with re-ordering.

FIG. 10 shows a design of an apparatus 1000 for sending packets in a wireless communication system. Apparatus 1000 includes a module 1012 to receive a sequence of packets from a first entity at a second entity, a module 1014 to re-order the packets in the sequence, and a module 1016 to send the re-ordered packets from the second entity to a third entity.

Figure 11:
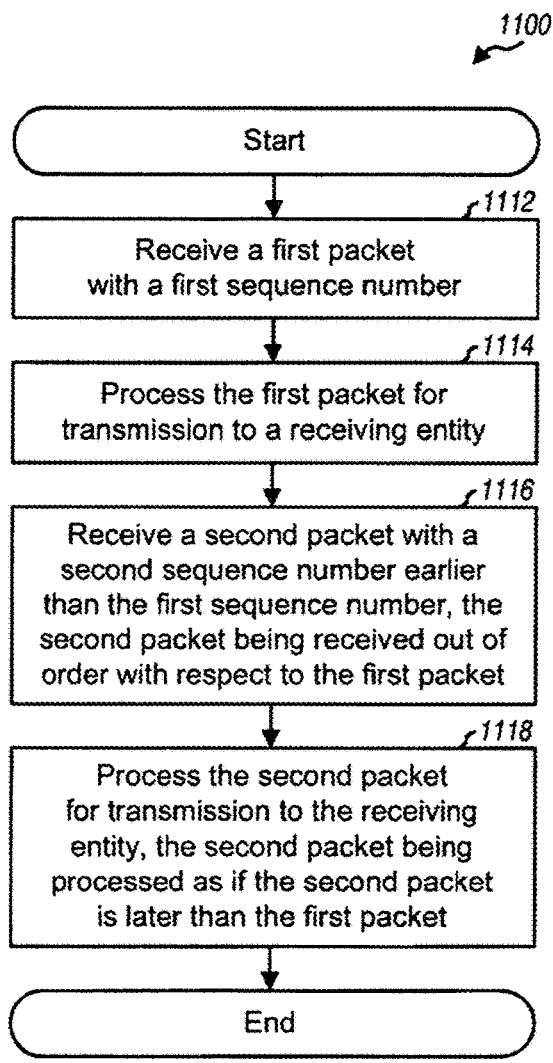
FIG. 11 shows a process for sending packets with forced ordering.

FIG. 11 shows a design of a process 1100 for sending packets in a wireless communication system. A first packet with a first sequence number may be received (block 1112) and processed for transmission to a receiving entity (block 1114). A second packet with a second sequence number earlier than the first sequence number may be received (block 1116). The second packet may be received out of order with respect to the first packet. The second packet may be processed as if it is later than the first packet for transmission to the receiving entity (block 1118). The first and second packets may be processed as each packet is received, without buffering these packets.

The receiving entity may be a UE. In one design, the first and second packets may be forwarded by a source base station to a target base station during handover of the UE from the source base station to the target base station. In another design, the first and second packets may be received by a base station from a serving gateway.

In one design of block 1114, the first packet may be ciphered with a first count comprising an HFN and the first sequence number. In one design of block 1118, the HFN may be incremented in response to receiving the second packet out of order. The second packet may be ciphered with a second count comprising the incremented HFN and the second sequence number.

In another design of block 1118, the second packet may be re-assigned with a third sequence number that is later than the first sequence number. The second packet may then be processed with the third sequence number for transmission to the receiving entity. A third packet with the third sequence number may be received thereafter and may be re-assigned with a fourth sequence number that is later than the third sequence number. The third packet may then be processed with the fourth sequence number for transmission to the receiving entity.

Figure 12:
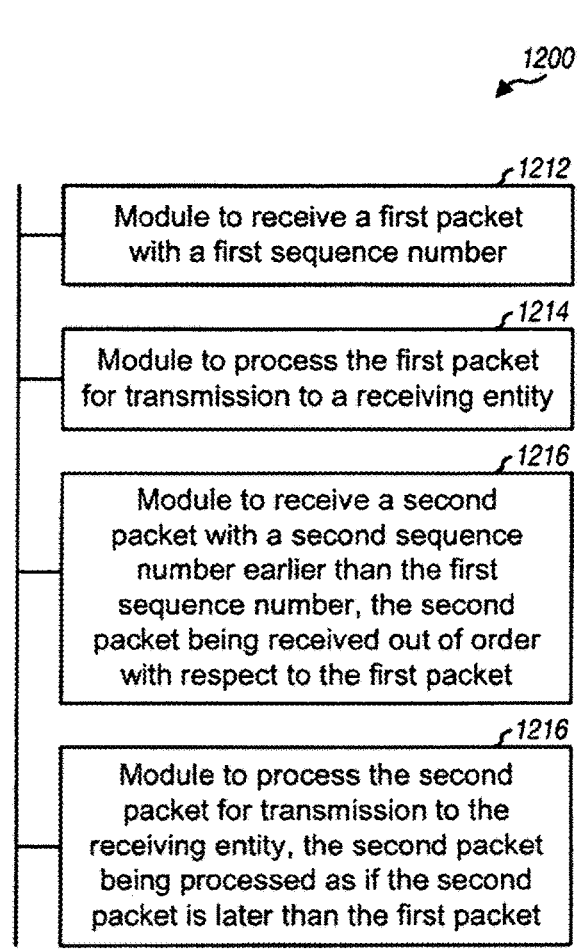
FIG. 12 shows an apparatus for sending packets with forced ordering.

FIG. 12 shows a design of an apparatus 1200 for sending packets in a wireless communication system. Apparatus 1200 includes a module 1212 to receive a first packet with a first sequence number, a module 1214 to process the first packet for transmission to a receiving entity, a module 1216 to receive a second packet with a second sequence number earlier than the first sequence number, with the second packet being received out of order with respect to the first packet, and a module 1218 to process the second packet for transmission to the receiving entity, with the second packet being processed as if it is later than the first packet.

FIG. 13 shows a design of a process 1300 for receiving packets in a wireless communication system. A sequence of packets may be received from a target base station at a UE (block 1312). The sequence of packets may be forwarded by a source base station to the target base station during handover of the UE from the source base station to the target base station. The target base station may (i) discard at least one forwarded packet that cannot be sent in order to the UE, or (ii) receive the forwarded packets out of order and re-order the packets prior to transmission to the UE, or (iii) receive a forwarded packet out of order and process the packet as if it is received in order.

Each packet in the sequence may be processed to recover the packet (block 1314). In one design, an HFN may be incremented if a packet has a smaller sequence number than a sequence number of a preceding packet in the sequence. The packet may be deciphered with a count comprising the HFN and the sequence number of the packet. Recovered packets may be delivered to upper layers. One or more recovered packets may be delivered out of order to the upper layers. The upper layers may re-order the data in the recovered packets.

FIG. 14 shows a design of an apparatus 1400 for sending packets in a wireless communication system. Apparatus 1400 includes a module 1412 to receive a sequence of packets from a target base station at a UE, and a module 1414 to process each packet in the sequence to recover the packet.

The modules in FIGS. 8, 10, 12 and 14 may comprise processors, electronics devices, hardware devices, electronics components, logical circuits, memories, etc., or any combination thereof.

Figure 15:
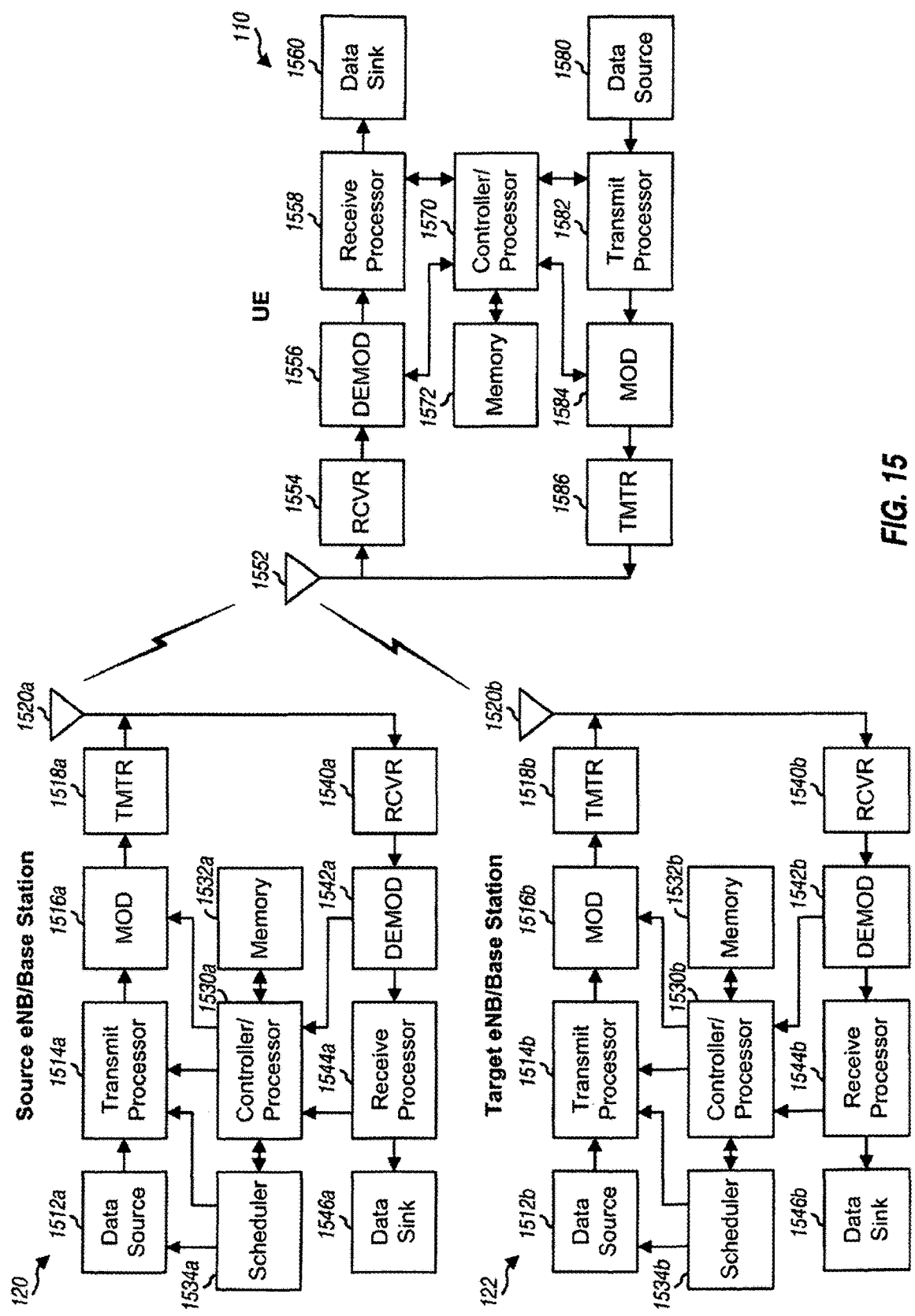
FIG. 15 shows a block diagram of a UE and two base stations.

FIG. 15 shows a block diagram of a design of UE 110, source eNB/base station 120, and target eNB/base station 122. At source eNB 120, a transmit processor 1514a may receive traffic data from a data source 1512a and control information from a controller/processor 1530a and a scheduler 1534a. Controller/processor 1530a may provide messages for handover of UE 120. Scheduler 1534a may provide an assignment of downlink and/or uplink resources for UE 120. Transmit processor 1514a may process (e.g., encode and symbol map) the traffic data, control information, and pilot and provide data symbols, control symbols, and pilot symbols, respectively. A modulator (MOD) 1516a may process the data, control, and pilot symbols (e.g., for OFDM) and provide output samples. A transmitter (TMTR) 1518a may condition (e.g., convert to analog, amplify, filter, and upconvert) the output samples and generate a downlink signal, which may be transmitted via an antenna 1520a.

Target eNB 122 may similarly process traffic data and control information for the UEs served by the eNB. The traffic data, control information, and pilot may be processed by a transmit processor 1514b, further processed by a modulator 1516b, conditioned by a transmitter 1518b, and transmitted via an antenna 1520b.

At UE 110, an antenna 1552 may receive the downlink signals from eNBs 120 and 122. A receiver (RCVR) 1554 may condition (e.g., filter, amplify, downconvert, and digitize) a received signal from antenna 1552 and provide input samples. A demodulator (DEMOD) 1556 may process the input samples (e.g., for OFDM) and provide detected symbols. A receive processor 1558 may process (e.g., symbol demap and decode) the detected symbols, provide decoded traffic data to a data sink 1560, and provide decoded control information to a controller/processor 1570.

On the uplink, a transmit processor 1582 may receive and process traffic data from a data source 1580 and control information (e.g., for handover) from controller/processor 1570. A modulator 1584 may process the symbols from processor 1582 (e.g., for SC-FDM) and provide output samples. A transmitter 1586 may condition the output samples and generate an uplink signal, which may be transmitted via antenna 1552. At each eNB, the uplink signals from UE 110 and other UEs may be received by antenna 1520, conditioned by a receiver 1540, demodulated by a demodulator 1542, and processed by a receive processor 1544. Processor 1544 may provide decoded traffic data to a data sink 1546 and decoded control information to controller/processor 1530.

Controllers/processors 1530*a*, 1530*b* and 1570 may direct the operation at eNBs 120 and 122 and UE 110, respectively. Controller/processor 1530 at each eNB may also perform or direct process 700 in FIG. 7, process 900 in FIG. 9, process 1100 in FIG. 11, and/or other processes for the techniques described herein. Controller/processor 1570 at UE 110 may perform or direct process 1300 in FIG. 13 and/or other processes for the techniques described herein. Memories 1532*a*, 1532*b* and 1572 may store data and program codes for eNBs 120 and 122 and UE 110, respectively. Schedulers 1534*a* and 1534*b* may schedule UEs for communication with eNBs 120 and 122, respectively, and may assign resources to the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving a sequence of packets from a first entity over a first communication link at a second entity;
   re-ordering the packets in the sequence received over the first communication link, the re-ordering including starting a time interval in response to receiving a first packet in the sequence from the first entity, wherein the time interval is based on a range of sequence numbers;
   processing each packet received from the first entity after the expiration of the time interval without buffering the packet, wherein at least one packet received from the first entity after the expiration of the time interval is configured to be sent after the expiration of the time interval; and
   sending the re-ordered packets from the second entity to a third entity.

2. The method of claim 1, wherein the first entity is a source base station, the second entity is a target base station, and the third entity is a user equipment (UE), and wherein the receiving, the re-ordering, and the sending are performed by the target base station during handover of the UE from the source base station to the target base station.

3. The method of claim 1, wherein the time interval comprises a re-ordering window.

4. The method of claim 1, wherein the re-ordering the packets comprises:
buffering the first packet if not received in order from the first entity,
buffering subsequent packets not received in order from the first entity prior to the expiration of the time interval, and
re-ordering the buffered packets after the expiration of the time interval.

5. The method of claim 4, further comprising:
receiving a packet from the first entity after the expiration of the time interval;
determining whether the packet can be sent in order to the third entity;
sending the packet to the third entity if the packet can be sent in order; and
discarding the packet if the packet cannot be sent in order.

6. An apparatus for wireless communication, comprising:
at least one processor configured to:
receive a sequence of packets from a first entity over a first communication link at a second entity;
re-order the packets in the sequence received over the first communication link, the re-ordering including starting a time interval in response to receiving a first packet in the sequence from the first entity, wherein the time interval is based on a range of sequence numbers;
process each packet received from the first entity after the expiration of the time interval without buffering the packet, wherein at least one packet received from the first entity after the expiration of the time interval is configured to be sent after the expiration of the time interval; and
send the re-ordered packets from the second entity to a third entity.

7. The apparatus of claim 6, wherein the at least one processor is configured to buffer the first packet if not received in order from the first entity, to buffer subsequent packets not received in order from the first entity prior to the expiration of the time interval, and to re-order the buffered packets after the expiration of the time interval.

8. The apparatus of claim 7, wherein the at least one processor is configured to receive a packet from the first entity after the expiration of the time interval, to determine whether the packet can be sent in order to the third entity, to send the packet to the third entity if the packet can be sent in order, and to discard the packet if the packet cannot be sent in order.

9. An apparatus for wireless communication, the apparatus comprising:
a memory; and
at least one processor coupled to the memory and configured to:
receive a sequence of packets from a first entity over a first communication link at a second entity;
reorder the packets in the sequence received over the first communication link, the re-ordering including starting a time interval in response to receiving a first packet in the sequence from the first entity, wherein the time interval is based on a range of sequence numbers;
process each packet received from the first entity after the expiration of the time interval without buffering the packet, wherein at least one packet received from the first entity after the expiration of the time interval is configured to be sent after the expiration of the time interval; and
send the reordered packets from the second entity to a third entity.

10. The apparatus of claim 9, wherein the first entity is a source base station, the second entity is a target base station, and the third entity is a user equipment (UE), and wherein the target base station is configured to receive the sequence of packets, to reorder the packets in the sequence, and to send the reordered packets during handover of the UE from the source base station to the target base station.

11. The apparatus of claim 9, wherein the time interval comprises a reordering window.

12. The apparatus of claim 9, wherein to reorder the packets, the at least one processor is configured to:
buffer the first packet if not received in order from the first entity, buffer subsequent packets not received in order from the first entity prior to the expiration of the time interval, and
reorder the buffered packets after the expiration of the time interval.

13. The apparatus of claim 12, wherein the at least one processor is further configured to:
receive a packet from the first entity after the expiration of the time interval;
determine whether the packet can be sent in order to the third entity;
send the packet to the third entity if the packet can be sent in order; and
discard the packet if the packet cannot be sent in order.

14. A non-transitory, computer-readable medium storing computer-executable code for wireless communication, comprising code to:
receive a sequence of packets from a first entity over a first communication link at a second entity;
reorder the packets in the sequence received over the first communication link, the re-ordering including starting a time interval in response to receiving a first packet in the sequence from the first entity, wherein the time interval is based on a range of sequence numbers;
process each packet received from the first entity after the expiration of the time interval without buffering the packet, wherein at least one packet received from the first entity after the expiration of the time interval is configured to be sent after the expiration of the time interval; and
send the reordered packets from the second entity to a third entity.

* * * * *